United States Patent Office 3,264,314
Patented August 2, 1966

3,264,314
HALOGENATED PHENYLCARBAMOYL
SACCHARIN
Joseph Willard Baker, Kirkwood, and Raymond Eugene Stenseth, Webster Groves, Mo., assignors to Monsanto Company, St. Louis, Mo., a corporation of Delaware
No Drawing. Filed June 28, 1965, Ser. No. 467,734
6 Claims. (Cl. 260—301)

This invention relates to a novel class of saccharin derivatives. More particularly, this invention is concerned with a class of new organic substances which are halogenated N-phenylcarbamoylsaccharin compounds. Such compounds are found to possess useful and unexpected biological activity.

The novel substances of this invention have the general formula,

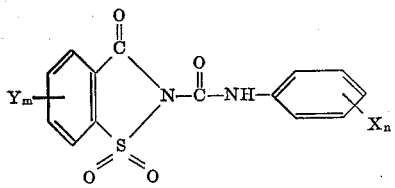

wherein X and Y are each selected from the group consisting of chlorine and bromine, $m$ is an integer from zero to three, $n$ is an integer from one to three, and the sum of $m$ and $n$ is at least two.

The compounds of this invention can be prepared by causing saccharin, or a halogenated derivative thereof, to react with a halophenyl isocyanate. The reaction temperatures employed in such preparations will vary depending upon the particular reactants utilized to obtain a desired end product. It is preferred, although not essential, to carry out the reactions in the presence of an inert organic solvent. Among the suitable solvents are benzene, toluene, xylene, hexane, heptane, octane, propyl ether, ethyl ether, tetrahydrofuran, dioxane and the like. Typical reactions with the scope of this invention are:

(a) 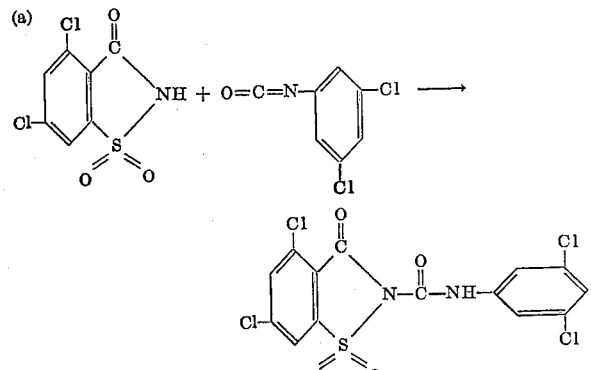

(b) 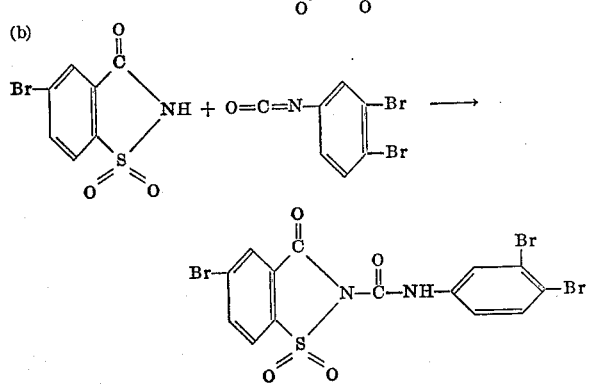

The invention will be more fully understood by reference to the following examples which are set forth herein solely for the purpose of illustration, and they are not to be construed as limiting the scope of the present invention.

Example I

A suitable reaction vessel is charged with 9.1 grams (0.05 mol) of saccharin in 425 ml. of toluene, and the mixture is dried by azeotropic distillation using a Dean-Stark trap. The resultant mixture is cooled to 25° C., and 9.4 grams (0.05 mol) of 3,4-dichlorophenyl isocyanate is added. The reactants are heated to refluxing temperature, and a few drops of pyridine are added. An additional few drops are added after 30 minutes, and the temperature is maintained for about 6 hours. The reaction product is then cooled and filtered. There is obtained N-(3,4-dichlorophenylcarbamoyl)saccharin, M.P. 230–232° C. Analysis shows 18.8% nitrogen and 7.45% chlorine as against calculated values of 19.1% and 7.55%, respectively.

Example II

Following the detailed procedures set forth in Example I, the reactants employed are 5,6-dichlorosaccharin and 3-bromophenyl isocyanate. The product obtained is N-(3-bromophenylcarbamoyl)-5,6-dichlorosaccharin.

Example III

Following the detailed procedures set forth in Example I, the reactants employed are 4-chlorosaccharin and 3,4,5-trichlorophenyl isocyanate. The product obtained is N-(3,4,5-trichlorophenylcarbamoyl)-4-chlorosaccharin.

Example IV

Following the detailed procedures set forth in Example I, the reactants employed are saccharin and 3,5-dibromophenyl isocyanate. The product obtained is N-(3,5-dibromophenylcarbamoyl)saccharin.

The compounds of this invention are useful as microbiocides adapted to be employed for the control of bacterial and fungal organisms. In a representative test, N-(3,4-dichlorophenylcarbamoyl)saccharin was found active against Staphylococcus aureus at a dilution of at least one part per million. This exemplary compound was also found to be effective against Salmonella typhosa and Aspergillus niger when employed at somewhat higher concentrations. Similar results are obtained with the other compounds of this invention.

While the invention has been described herein with regard to certain specific embodiments, it is not so limited. It is to be understood that variations and modifications thereof may be made by those skilled in the art without departing from the spirit and scope of the invention.

What is claimed is:
1. A compound of the formula

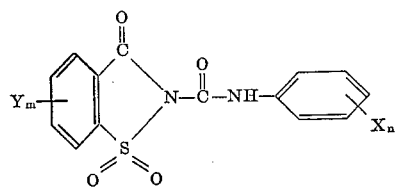

wherein X and Y are each selected from the group consisting of chlorine and bromine, $m$ is an integer from zero to three, $n$ is an integer from one to three, and the sum of $m$ and $n$ is at least two.

2. A compound of the formula

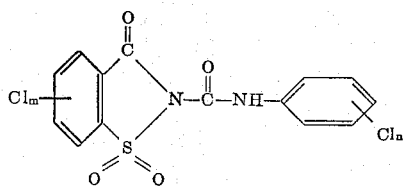

wherein $m$ is an integer from zero to three, $n$ is an integer from one to three, and the sum of $m$ and $n$ is at least two.

3. N-(3,4-dichlorophenylcarbamoyl)saccharin.
4. N-(3,5-dibromophenylcarbamoyl)saccharin.
5. N-(3,4,5-trichlorophenylcarbamoyl)saccharin.
6. N - (3,4 - dichlorophenylcarbamoyl)-4-chlorosaccharin.

No references cited.

HENRY R. JILES, *Acting Primary Examiner.*
ALTON D. ROLLINS, *Assistant Examiner.*